United States Patent [19]
Nguyen

[11] Patent Number: 5,333,006
[45] Date of Patent: Jul. 26, 1994

[54] LEAD LOADER MECHANISM FOR A PENCIL PLOTTER

[75] Inventor: Patrick Nguyen, Diamond Bar, Calif.
[73] Assignee: CalComp Inc., Anaheim, Calif.
[21] Appl. No.: 848,588
[22] Filed: Mar. 9, 1992
[51] Int. Cl.$^5$ .................. G01D 15/16; B43L 13/00
[52] U.S. Cl. ..................... 346/139 R; 33/18.1
[58] Field of Search .......... 346/29, 49, 139 R, 139 C; 33/18.1, 18.2

[56] References Cited

U.S. PATENT DOCUMENTS

| | | | |
|---|---|---|---|
| 4,991,300 | 2/1991 | Takahashi | 33/18.2 |
| 5,179,393 | 1/1993 | Takahashi | 346/139 R |

FOREIGN PATENT DOCUMENTS

| | | | |
|---|---|---|---|
| 0169698 | 7/1991 | Japan | 33/18.1 |

Primary Examiner—Benjamin R. Fuller
Assistant Examiner—Alrick Bobb
Attorney, Agent, or Firm—Frederic P. Smith; William F. Porter, Jr.

[57] ABSTRACT

A lead loader mechanism for a pencil plotter in which a lead stocker contains a plurality of leads for use in a pencil plotter, at least one lead actuator mechanism is coupled to the lead stocker and is adapted to release the leads, and a support is provided for holding at least one lead holder and for engaging the lead actuator mechanism to release the leads into the lead holder. In a particular embodiment, the lead stocker has at least one lead storage chamber therein and the lead actuator mechanism is mounted on the lead stocker below the lead storage chamber and is adapted to be changed from a first condition in which the leads are prevented from leaving the lead storage chamber to a second condition in which the leads are free to leave the lead storage chamber, and the support is adapted to cause the lead actuator mechanism to change from the first condition to the second condition.

12 Claims, 3 Drawing Sheets

LEAD LOADER MECHANISM FOR A PENCIL PLOTTER

BACKGROUND OF THE INVENTION

1. Field of the Invention

This invention relates to the field of pencil plotters and, in particular, to a lead loader mechanism for a pencil plotter in which a lead actuator mechanism releases leads from a lead stocker into a lead holder upon interaction with the support for the lead holder.

2. Description of Related Art

The use of pencil plotters has increased significantly in the making of graphics and drawings due to the ability of designers and draftsmen to be able to make alterations or corrections to such graphics and drawings. In order to increase the flexibility of the pencil plotters, it is desirable that lead holders carrying different hardnesses or colors of lead be able to be easily placed into and removed from the pencil carriage. In addition, it is necessary to have a mechanism for being able to replace the lead in a lead holder by a lead of the same hardness or color when the lead has been used up. The latter problem has been generally solved by having a plurality of removable lead holder carousels, each one holding a plurality of lead holders of the same kind. When the lead in a lead holder is used up, the lead holder in the pencil carriage is replaced by a lead holder in the carousel. When a lead of different hardness or color is desired, the lead holder is transferred from the pencil carriage to the carousel and the carousel is replaced with a carousel carrying lead holders having the desired hardness or color. More recently, plotter designs have been introduced having a single carousel carrying a plurality of lead holders of differing hardnesses and colors and having the positions of the lead holders indexed so that the pencil carriage can receive a lead holder carrying a lead of desirable hardness or color. The problem still remained, however, of replacing a lead when it had been used up without having to replace the entire carousel with a new carousel in which the leads have been renewed.

In order to solve such lead replacement problem, the use of lead stockers has been employed. Such lead stockers are similar to lead holder carousels in that they are rotatable and carry a plurality of chambers or magazines into which a plurality of replacement leads of differing hardnesses and colors can be inserted. In theory, the rotatable lead stocker can be indexed to the rotatable lead holder carousel and a lead of proper hardness or color can be transferred into the corresponding lead holder when its lead has run out. In practice, however, problems have arisen in the mechanization of the transfer process and particularly in assuring that the transfer will take place at the proper instant in time and position of the various elements of the system. While various motorization, timing and sensing techniques have been employed to ensure a properly timed and positioned lead transfer, these techniques have been found to be costly and lacking in accuracy and dependability.

Thus, it is a primary object of the present invention to provide an improved lead loader mechanism for a pencil plotter.

It is another object of the present invention to provide an improved lead loader mechanism which ensures a properly timed and positioned transfer of lead from a lead stocker to a lead holder.

It is a further object of the present invention to provide an improved lead loader mechanism which does not require expensive and accurately timed motorization techniques to effectuate a reliable transfer of lead from a lead stocker to a lead holder.

It is still another object of the present invention to provide an improved lead loader mechanism which obviates the need for accurate sensing and timing techniques for the dependable transfer of a lead from a lead stocker to a lead holder.

SUMMARY OF THE INVENTION

A lead loader mechanism for a pencil plotter is provided in which a lead stocker contains a plurality of leads for use in a pencil plotter, at least one lead actuator mechanism is coupled to the lead stocker and is adapted to release the leads, and support means is provided for holding at least one lead holder and for engaging the lead actuator mechanism to release the leads into the lead holder. In a particular embodiment, the lead stocker has at least one lead storage chamber therein and the lead actuator mechanism is mounted on the lead stocker below the lead storage chamber and is adapted to be changed from a first condition in which the leads are prevented from leaving the lead storage chamber to a second condition in which the leads are free to leave the lead storage chamber, and the support means is adapted to cause the lead actuator mechanism to change from the first condition to the second condition.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
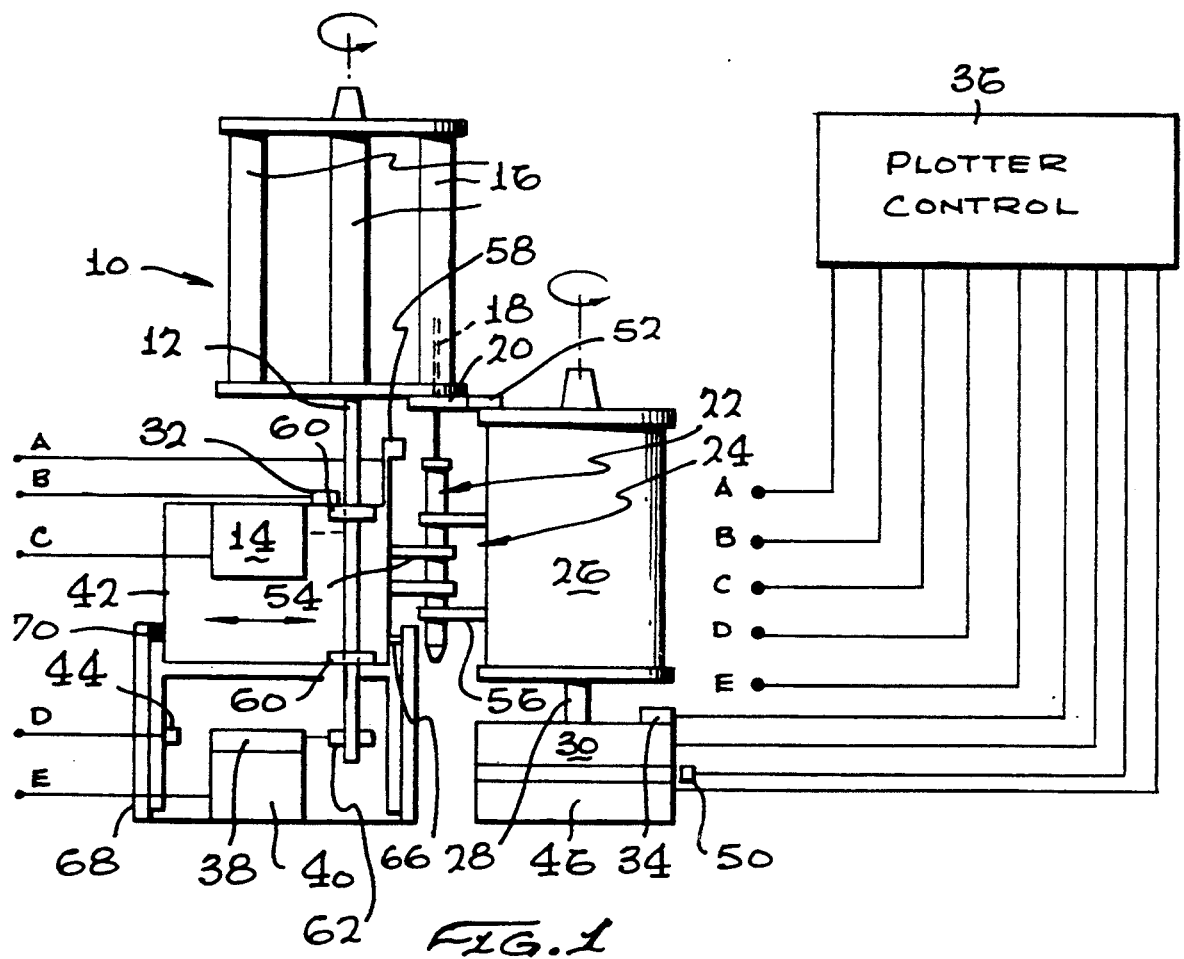
FIG. 1 is a simplified view of a lead loader and positioner mechanism coupled to electronics suitable for the operation of the present invention.

Referring now to FIG. 1, a lead stocker 10 is shown mounted on shaft 12 and rotationally driven by motor 14. The lead stocker 10 has a plurality of lead storage chambers or magazines 16 each of which holds a plurality of leads 18. The leads 18 in each lead chamber 16 are of the same color or hardness, but each of the lead chambers 16 generally contains leads 18 of differing color or hardness. The leads 18 are individually dropped by lead actuator mechanism 20 into lead holder 22 which is held or supported by a finger mechanism 24 extending from a rotatable carousel 26. The finger mechanism 24 may be of the type shown in my copending patent application, Ser. No. 07/834,967, filed Feb. 14, 1992, entitled "Finger Mechanism for a Lead Holder", now abandoned assigned to the same assignee as the present invention. The carousel 26 is mounted on shaft 28 and is rotatably driven by motor 30. The rotational positions of lead stocker 10 and carousel 26 are sensed by sensors 32, 34. The outputs of sensors 32, 34 are coupled to plotter control 36 which in turn provides appropriate outputs to stocker motor 14 and carousel motor 30 to coordinate the rotational positions of lead stocker 10 and carousel 26, as desired.

In operation, as will be shown in greater detail hereinafter, the lead stocker 10 and the carousel 26 are moved into proper position with respect to one another to enable the lead actuator mechanism 20 to drop a lead 18 into the lead holder 22. In a first embodiment, this is accomplished by an eccentrically mounted cam 38, driven by motor 40, translating cam follower 62 coupled to shaft 12, lead stocker 10 and motor 14 mounted on a slidable, spring-loaded support 42 toward carousel 26. Sensor 44 determines the position of cam 38 and provides an output to plotter control 36 which provides an appropriate output to cam motor 40 to rotate cam 38 and translate lead stocker 10 toward carousel 26. Cam 38 also has a plurality of loops thereon and thus acts as a shaker mechanism to provide a vibrational motion to the lead stocker 10 to enable the leads 18 to be released individually into the lead holder 22 by the lead actuator mechanism 20. In a second embodiment, carousel 26 is translated toward lead stocker 10 by motor 46, with carousel 26, shaft 28 and motor 30 being mounted on a slider mechanism 48 shown in greater detail hereinafter. Sensor 50 senses the position of slider mechanism 48 and provides an output to plotter control 36 which provides an appropriate output to slider motor 46 to translate carousel 28 toward lead stocker 10 and to stop such translation when all elements are in their final and proper position. In this particular embodiment, cam 38 is concentrically mounted but continues to provide the aforementioned vibrational motion to lead stocker 10.

When the lead stocker 10 and the carousel 26 are approaching one another, the lead actuator mechanism 20 is engaged by pusher rod 52 mounted on and extending from carousel 26 and the index features 54 extending from the support 42 engage the lead holder 22 held by finger mechanism 24 which has its own index features 56 positioning lead holder 22. At the precise moment when the lead stocker 10, the carousel 26 and the lead holder 22 are properly positioned and aligned, pusher rod 52 causes lead actuator mechanism 20 to reach a condition where a lead 18 is allowed to drop into lead holder 22. This lead transfer is sensed by sensor 58 which provides an output to plotter control 36 to cause the lead stocker 10 or the carousel 26 to move back to its initial position and await further instructions. If no lead transfer is sensed, the procedure may be repeated until a lead is transfered or a signal may be given to an attendant to examine the mechanism or both.

Figure 3:
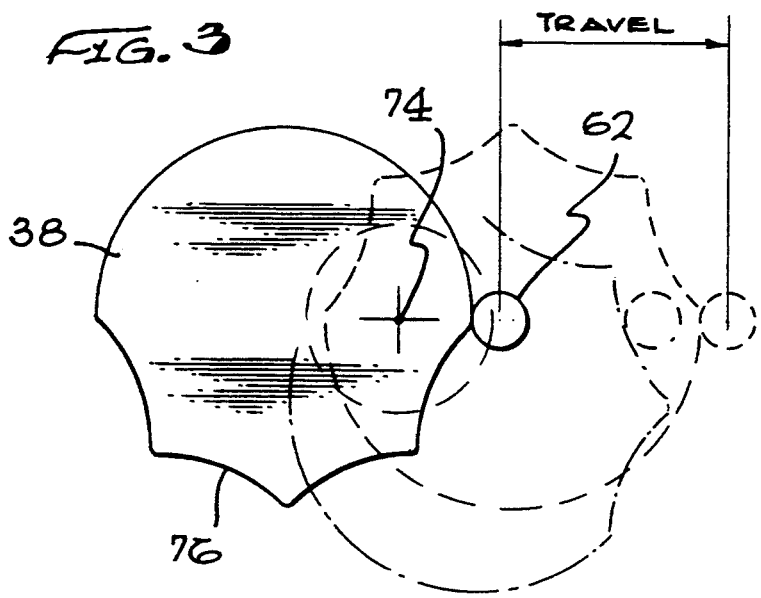
FIG. 3 illustrates the looped cam and cam follower mechanism of FIG. 2.
Figure 2:
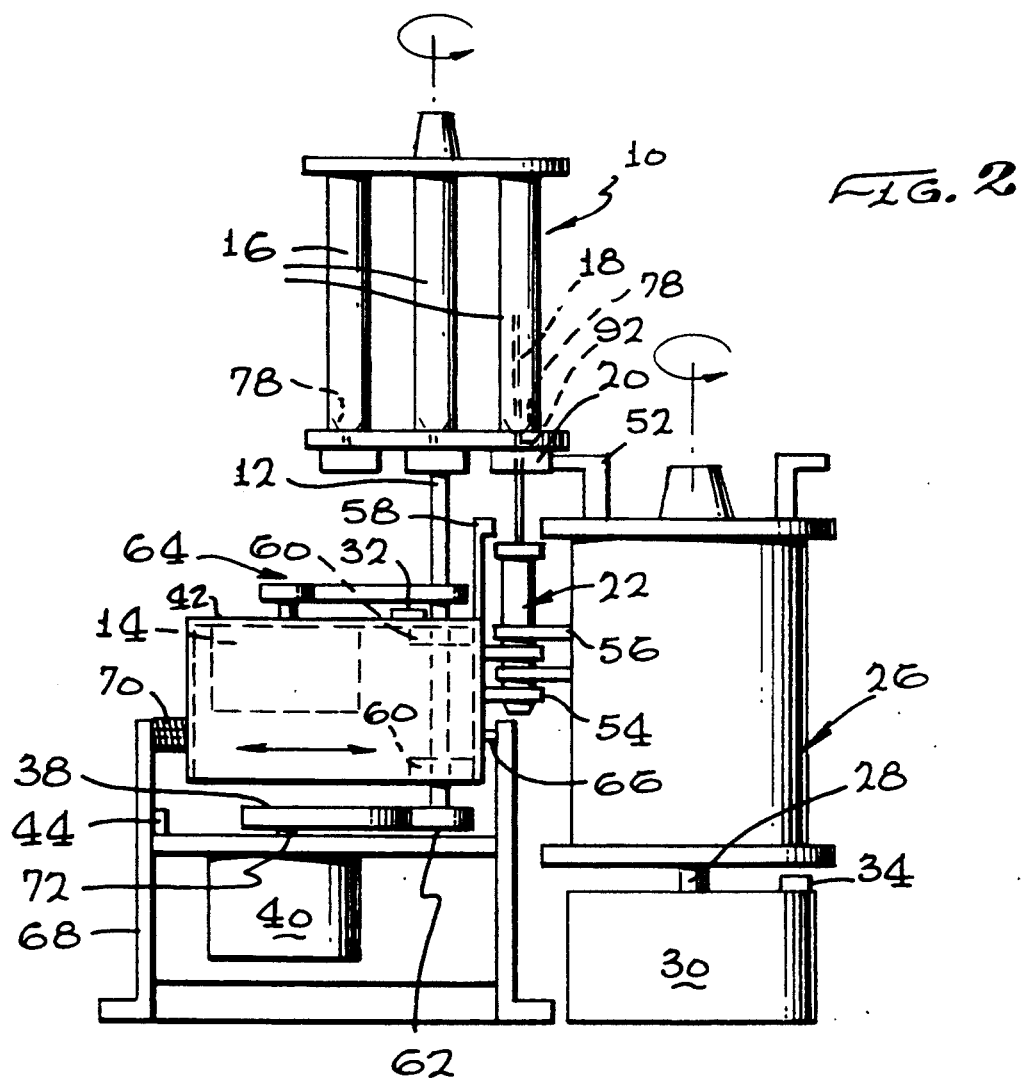
FIG. 2 illustrates in greater detail a first embodiment of the present invention.
Figure 4:
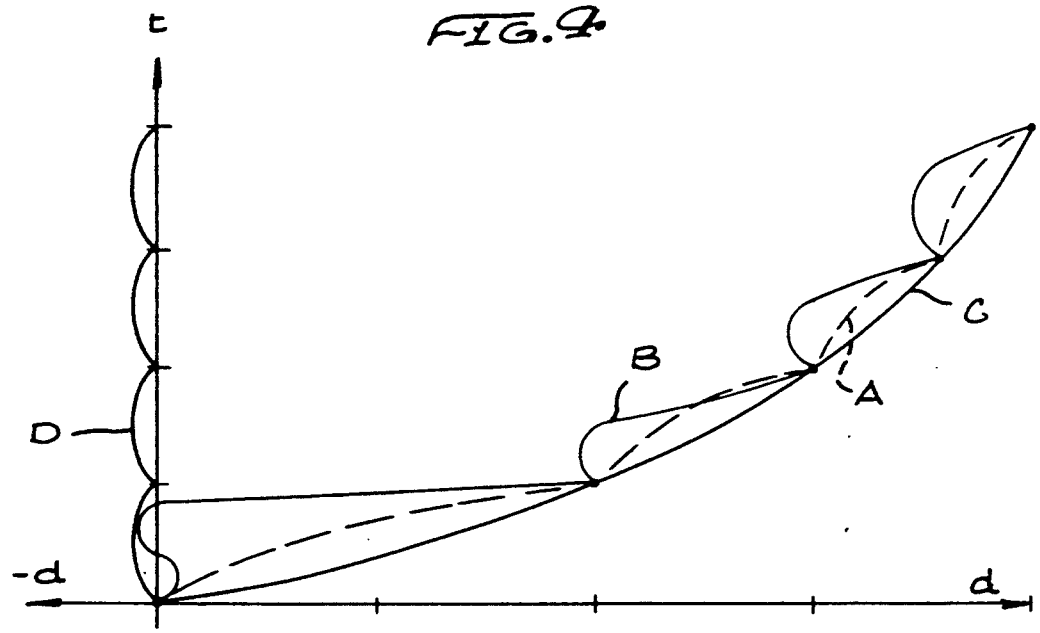
FIG. 4 graphically illustrates the motion of the cam follower and the lead stocker under differing cam configurations.

Referring now to FIG. 2, the first embodiment of the present invention is illustrated in greater detail. Lead stocker 10 is shown mounted on shaft 12 which is supported by bearings 60 and has a cam follower 62 at the lower end thereof. Bearings 60 are coupled to support 42 carrying motor 14 which rotatably drives the shaft 12 by belt and pulley arrangement 64. Support 42 is slidably mounted on bars 66 coupled to support 68 and is spring-loaded by tension spring 70 in an initial position where the lead stocker 10 does not interact with lead holder carousel 26. Support 68 also carries motor 40 which drives shaft 72 on which is mounted cam 38. As is shown in FIGS. 3 and 4, cam 38 is eccentrically mounted to rotate around point 74 and has an initial position sensed by sensor 44 where cam follower 62, and shaft 12 and lead stocker 10, are furthest from carousel 26. When cam 38 is driven by motor 40 it causes cam follower 62, and lead stocker 10, to travel or translate towards carousel 26 and then to return under the urging of tension spring 70. Since, as described previously, cam 38 has a plurality of loops 76 thereon, cam follower 62, and lead stocker 10, has an irregular translational motion imparted to it by cam 38 and follows a path in time shown by curves A or B in FIG. 4. Curve A illustrates the result of cam 38 having a plurality of shallow loops 76 so that cam follower 62, and lead stocker 10, while slowing down and speeding up, always has a forward motion toward carousel 26. When, however, the loops 76 are made deep enough, cam follower 62, and lead stocker 10, will actually reverse direction under the urging of tension spring 70 before being forced again to translate toward carousel 26 by cam 38. Since cam 38 has loops 76 only on one side thereof, as shown in FIG. 3, cam follower 62, and lead stocker 10, will follow smooth curve C of FIG. 4 on its return to its initial position.

Figure 5:
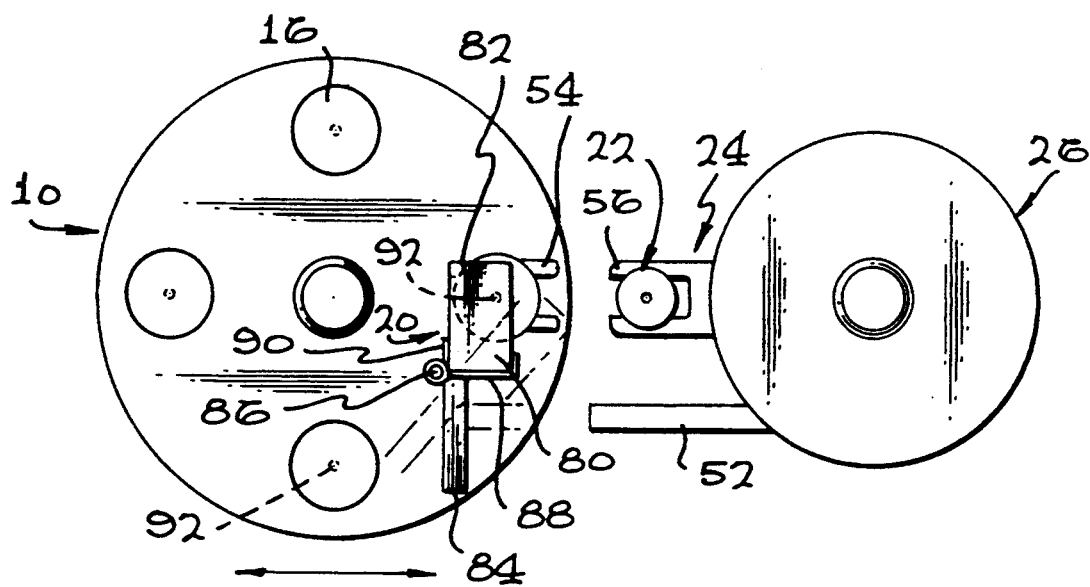
FIG. 5 illustrates in detail the operation of the lead actuator mechanism of the lead stocker.

Thus, in operation, cam 38 is actuated by plotter control 36 and interacts with cam follower 62 to cause shaft 12, support 42 and lead stocker 10 to translate toward carousel 26 while simultaneously imparting a vibrational motion to lead stocker 10. This vibrational motion causes one of the plurality of leads 18 in chambers 16 to enter the conical shaped portions 78 of chambers 16 and thus be in position to be released by lead actuator mechanism 20 into lead holder 22 when all elements are properly positioned. As stated previously, when the lead stocker 10 and the carousel 26 approach one another, the lead actuator mechanism 20 is engaged by pusher rod 52. Since carousel 26 is rotatable, there will in general be one pusher rod 52 for each lead holder 22. As is shown in greater detail in FIG. 5, the lead holder 22 is held by finger mechanism 24 and index features 56 extending from carousel 26 along with pusher rod 52. Lead actuator mechanism 20 is shown consisting of an actuator body 80 having a cover portion 82 and an arm portion 84. The actuator body 80 is coupled to lead stocker 10 by pin 86 and rotates around the center of pin 86. A torsional spring 88 is also coupled to the lead stocker 10 by pin 86 and is positioned at one end by spring locator stop 90, which also acts as a stop for actuator body 80, and is engaged at the other end by actuator body 80. In its first condition or position, the lead actuator mechanism 20 covers the exit hole portion 92 of conical shaped portion 78 of chamber 16. When the lead stocker 10 is sufficiently close to the carousel 26, pusher rod 52 engages arm portion 84 of actuator body 80 imparting a clockwise motion thereto around pin 86 against the force of torsional spring 88. Cover portion 82 of actuator body 80 also rotates clockwise and thus moves into position to begin to expose the exit hole portion 92 of conical shaped portion 78 of chamber 16. As lead stocker 10 and carousel 26 move closer toward one another and lead holder 22 is engaged by index features 54 extending from lead stocker 10, pusher rod 52 causes arm portion 84 and cover portion 82 to further rotate and begin to expose exit hole portion 92. When sensor 44 senses that cam 38 has moved all elements into their final and proper position, sensor 44 sends a signal to plotter control 36 to stop cam motor 40. At this time, lead actuator mechanism 20 has changed to a second condition or position where exit hole portion 92 is fully exposed and lead 18 drops into lead holder 22. Lead stocker 10 and carousel 26 then disengage, as described above, and torsional spring 88 causes actuator body 80 to return to its initial condition or position and cover exit hole portion 92.

Figure 6:
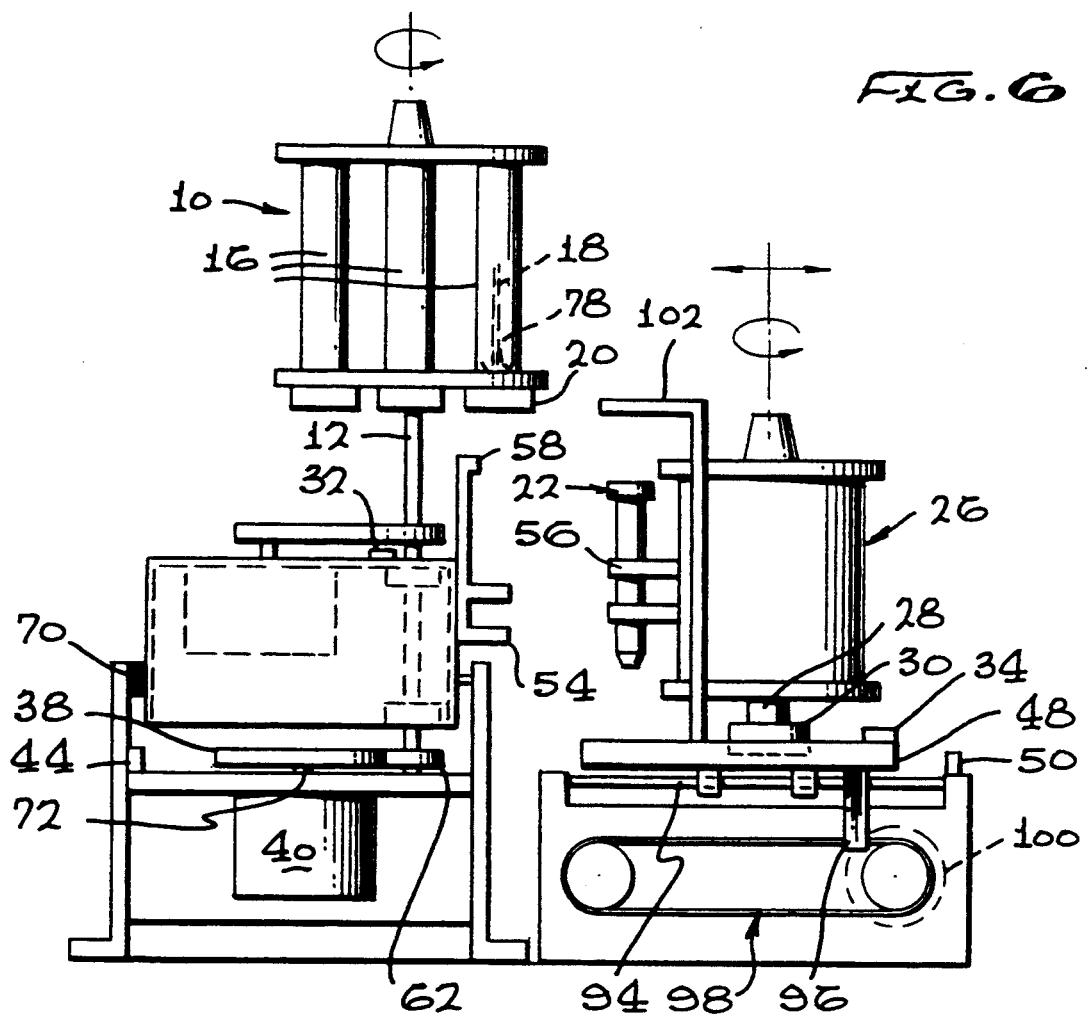
FIG. 6 illustrates a second embodiment of the present invention.

In FIG. 6, a second embodiment of the invention is illustrated. In this embodiment, carousel 26, shaft 28 and motor 30 are mounted on slider mechanism 48. Slider mechanism 48 rides on bars 94 and is coupled by dependent portion 96 to a belt and pulley arrangement 98 driven by motor 100. Slider mechanism 48 also has coupled to it a pusher rod 102 which is adapted to engage lead actuator mechanism 20. Thus carousel 26 and slider mechanism 48 act as a unitary mechanism which supports lead holder 22 and is configured to engage lead actuator mechanism 20. In operation, motor 100 in response to a signal from plotter control 36, which in turn is receiving signals from sensor 50, drives carousel 26 toward lead stocker 10 until, as described previously, lead holder 22 is positioned by index features 54, 56 and pusher rod 102 has fully engaged lead actuator mechanism 20 causing lead 18 to drop from chamber 16 into lead holder 22. During the period of travel by carousel 26 toward lead stocker 10, plotter control 36 has also actuated motor 40 to drive cam 38. In this embodiment, however, cam 38 is mounted concentrically on shaft 72 and thus cam follower 62, shaft 12 and lead stocker 10 do not translate but merely vibrate, as shown by curve D in FIG. 4, during such period of travel in order to cause one of the plurality of leads 18 in chambers 16 to enter the conical shaped portions 78 of chambers 16.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:

1. A lead loader mechanism for a pencil plotter comprising:
    a lead stocker containing a plurality of leads for use in a pencil plotter;
    at least one lead actuator mechanism coupled to said lead stocker for releasing said leads;
    support means for holding at least one lead holder, said support means including engaging means for engaging said at least one lead actuator mechanism to cause said leads in said lead stocker to be released into said lead holder; and
    means for causing said means and said at least one lead actuator mechanism to engage to cause said leads to be released into said at least one lead holder.

2. The lead loader mechanism of claim 1 wherein said lead stocker has at least one lead storage chamber therein and said at least one lead actuator mechanism is mounted on said lead stocker below said lead storage chamber and is changeable from a first condition in which said leads are prevented from leaving said lead storage chamber to a second condition in which said leads are free to leave said lead storage chamber.

3. The lead loader mechanism of claim 2 wherein said means causes said lead actuator mechanism to change from said first condition to said second condition.

4. The lead loader mechanism of claim 2 wherein said at least one lead actuator mechanism is pivotally mounted on said lead stocker and moves from a first position in which said leads are prevented from leaving said at least one lead storage chamber to a second position in which said leads are free to leave said at least one lead storage chamber.

5. The lead loader mechanism of claim 4 wherein said engaging means causes said at least one lead actuator mechanism to move from said first position to said second position.

6. The lead loader mechanism of claim 2 wherein said at least one lead actuator mechanism is spring-loaded to return to said first position.

7. The lead loader mechanism of claim 1 wherein said support means has a first portion for holding said at least one lead holder and a second portion including said engaging means for engaging said at least one lead actuator mechanism.

8. The lead loader mechanism of claim 3 wherein said support means translates toward said lead stocker to cause said engaging means to engage said at least one lead actuator mechanism and to cause said lead actuator mechanism to be changed from said first to said second condition.

9. The lead loader mechanism of claim 8 wherein said support means holds a plurality of lead holders and said engaging means engages a plurality of lead actuator mechanisms.

10. The lead loader mechanism of claim 3 wherein said lead stocker translates toward said support means to cause said engaging means to engage said at least one lead actuator mechanism and to cause said at least one lead actuator mechanism to be changed from said first condition to said second condition.

11. The lead loader mechanism of claim 1 wherein said support means holds a plurality of lead holders and engaging means a plurality of each of said engaging means associated with each of said lead holders to engage a plurality of lead actuator mechanisms.

12. The lead loader mechanism of claim 1 wherein said lead stocker has a plurality of lead storage chambers therein and a lead actuator mechanism associated with each of said lead storage chambers.

* * * * *